US011934527B2

(12) United States Patent
Gilton et al.

(10) Patent No.: US 11,934,527 B2
(45) Date of Patent: Mar. 19, 2024

(54) DEVICES, SYSTEMS, AND METHODS FOR SECURELY INITIALIZING AN EMBEDDED SYSTEM

(71) Applicant: General Electric Company, Schenectady, NY (US)

(72) Inventors: Jeffrey S. Gilton, Cincinnati, OH (US); Matthew B. Pfenninger, Cincinnati, OH (US); Douglas R. Nichols, Kentwood, MI (US); Mark E Hingsbergen, Fairfield Township, OH (US)

(73) Assignee: General Electric Company, Schenectady, NY (US)

( * ) Notice: Subject to any disclaimer, the term of this patent is extended or adjusted under 35 U.S.C. 154(b) by 427 days.

(21) Appl. No.: 17/030,624

(22) Filed: Sep. 24, 2020

(65) Prior Publication Data
US 2021/0097185 A1 Apr. 1, 2021

Related U.S. Application Data

(60) Provisional application No. 62/906,348, filed on Sep. 26, 2019.

(51) Int. Cl.
*G06F 21/00* (2013.01)
*G06F 8/61* (2018.01)
(Continued)

(52) U.S. Cl.
CPC .............. *G06F 21/575* (2013.01); *G06F 8/63* (2013.01); *G06F 9/4406* (2013.01); *G06F 21/54* (2013.01); *G06F 21/602* (2013.01); *G06F 21/107* (2023.08)

(58) Field of Classification Search
None
See application file for complete search history.

(56) References Cited

U.S. PATENT DOCUMENTS 6,894,611 B2   5/2005 Butz et al.
7,313,705 B2 * 12/2007 Turkboylari .......... G06F 21/575
                                                        713/169
(Continued)

FOREIGN PATENT DOCUMENTS

CN      104238491 A    12/2014
CN      110131050 A    8/2019
(Continued)

OTHER PUBLICATIONS

Sarmah, Mrinal J. et al. Methods for Booting an All Programmable System-on-Chip Over PCI Express Link. 2017 IEEE International Conference on Computational Intelligence and Computing Research (ICCIC). https://ieeexplore.ieee.org/stamp/stamp.jsp?tp=&arnumber=8524555 (Year: 2017).*

(Continued)

*Primary Examiner* — Jeremiah L Avery
(74) *Attorney, Agent, or Firm* — Dinsmore & Shohl LLP

(57) ABSTRACT

A method is disclosed and includes authenticating a first stage boot loader and authenticating a second stage boot loader in response to authentication of the first stage boot loader. The method also includes executing the second stage boot loader in response to authentication of the second stage boot loader. Executing the second stage boot loader includes loading an operating system, a first set of machine-readable instructions, and first configuration information associated with the first set of machine-readable instructions onto a non-transitory computer-readable medium, wherein the first set of machine-readable instructions and the first configuration information are associated with one or more priority partitions. Executing the second stage boot loader includes authenticating the operating system and the first set of machine-readable instructions. Executing the second stage boot loader includes executing the first set of machine-readable instructions in response to authentication of the (Continued)

operating system and the first set of machine-readable instructions.

20 Claims, 7 Drawing Sheets

(51) Int. Cl.
    *G06F 9/4401*     (2018.01)
    *G06F 21/54*     (2013.01)
    *G06F 21/57*     (2013.01)
    *G06F 21/60*     (2013.01)
    *G06F 21/10*     (2013.01)

(56) References Cited

U.S. PATENT DOCUMENTS

| | | | |
|---|---|---|---|
| 9,141,802 B2 | 9/2015 | Yao et al. | |
| 9,230,112 B1 | 1/2016 | Peterson et al. | |
| 9,589,138 B2 | 3/2017 | Yao et al. | |
| 9,792,440 B1* | 10/2017 | Wang | H04L 63/1466 |
| 9,826,039 B2 | 11/2017 | Goldstein et al. | |
| 9,893,898 B2* | 2/2018 | Kreft | H04L 9/0643 |
| 10,467,416 B2 | 11/2019 | Callaghan | |
| 10,614,220 B2 | 4/2020 | Shin et al. | |
| 10,796,004 B1* | 10/2020 | Davis | H04L 9/3242 |
| 2003/0056107 A1* | 3/2003 | Cammack | G06F 21/575 713/189 |
| 2005/0132357 A1* | 6/2005 | Shell | G06F 21/575 717/174 |
| 2005/0193189 A1* | 9/2005 | Kim | G06F 9/4416 713/1 |
| 2007/0061880 A1* | 3/2007 | Depta | G06F 21/575 726/20 |
| 2008/0028235 A1* | 1/2008 | Smith | G06F 21/575 713/190 |
| 2012/0011354 A1* | 1/2012 | Owen | G06F 9/4408 713/2 |
| 2014/0075567 A1* | 3/2014 | Raleigh | G06Q 30/0283 726/26 |
| 2016/0021486 A1 | 1/2016 | Rencher et al. | |
| 2016/0034683 A1* | 2/2016 | Lee | G06F 9/4408 726/17 |
| 2017/0277897 A1* | 9/2017 | Jang | G06F 21/575 |
| 2018/0097639 A1* | 4/2018 | Gulati | G06F 8/61 |
| 2019/0253417 A1* | 8/2019 | Kim | G06F 21/60 |
| 2019/0258251 A1* | 8/2019 | Ditty | G05D 1/0248 |
| 2019/0312734 A1* | 10/2019 | Wentz | H04L 9/3234 |
| 2020/0104506 A1* | 4/2020 | Kallenberg | G06F 9/4406 |
| 2020/0341746 A1* | 10/2020 | Mehra | G06F 8/658 |

FOREIGN PATENT DOCUMENTS

| | | |
|---|---|---|
| CN | 111241552 A | 6/2020 |
| EP | 2442195 B1 | 12/2017 |
| FR | 3084500 A1 | 1/2020 |

OTHER PUBLICATIONS

Lohr, Hans et al. Patterns for Secure Boot and Secure Storage in Computer Systems. 2010 International Conference on Availability, Reliability and Security. https://ieeexplore.ieee.org/stamp/stamp.jsp?tp=&arnumber=5438035 (Year: 2010).*

Profentzas, Christos et al. Performance of Secure Boot in Embedded Systems. : 2019 15th International Conference on Distributed Computing in Sensor Systems (DCOSS). https://ieeexplore.ieee.org/stamp/stamp.jsp?tp=&arnumber=8804799 (Year: 2019).*

Shravan, et al. "Hypervisor Based Approach for Integrated Cockpit Solutions" 2018 IEEE 8th International Conference on Consumer Electronics—Berlin (ICCE—Berlin), IEEE, Sep. 2, 2018, pp. 1-6, XP033475017, DOI: 10-1109/ICCE-BERLIN.2018.8576222.

European Extended Search Report for EP Application No. 20195697.6 dated Feb. 18, 2021 (9 pages).

Chinese Office Action for Application No. 202011026402.0 dated Jan. 30, 2024 (21 pages with English Translation).

\* cited by examiner

DEVICES, SYSTEMS, AND METHODS FOR SECURELY INITIALIZING AN EMBEDDED SYSTEM

CROSS-REFERENCE TO RELATED APPLICATIONS

The present application claims the benefit of U.S. Provisional Application Ser. No. 62/906,348, filed Sep. 26, 2019, and entitled "Devices, Systems, and Methods for Securely Initializing an Embedded System," the entirety of which is incorporated by reference herein.

FIELD

The present specification generally relates to devices, systems, and methods for securely initializing an engine control system, and more particularly, to securely initializing an engine control system of an aircraft system in stages to prevent tampering and to minimize the impact on engine operation.

BACKGROUND

Aircraft systems may incorporate a plurality of sensors that sense various conditions relating to the aircraft components, which are used by software programs to detect, diagnose, or predict issues and/or faults in real time, even as the aircraft is being operated (e.g., flying). When a component of an aircraft system is reset or powered on, the software programs may be loaded onto a memory device, and a processing device of the aircraft system may subsequently execute the software programs once they are loaded onto the memory device.

Prior to loading the software programs onto the memory device and prior to executing the software programs, an initialization protocol may be executed. During the initialization protocol, the software programs may be authenticated using various cryptographic authentication methods in order to, for example, confirm that the software was not subjected to tampering. Once the software programs are authenticated, the software programs may be loaded onto the memory device for subsequent execution by the processing device.

However, when the aircraft systems are reset, the engine of the aircraft may still be operating. Since the software programs utilized for controlling and monitoring the engine are not executed until after the initialization protocol is completed, the operation of the engine may be negatively impacted if the initialization protocol is not completed within a certain period of time. Accordingly, a need exists for initialization protocols that prevent tampering of the aircraft systems and minimize the negative impact on engine operation.

SUMMARY

In an embodiment, a method for initiating an engine control system of an aircraft includes authenticating, by one or more processors, a first stage boot loader. The method includes authenticating, by the one or more processors, a second stage boot loader in response to authentication of the first stage boot loader. The method includes executing, by the one or more processors, the second stage boot loader in response to authentication of the second stage boot loader. Executing the second stage boot loader includes loading, by the one or more processors, an operating system, a first set of machine-readable instructions, and first configuration information associated with the first set of machine-readable instructions onto a non-transitory computer-readable medium, wherein the first set of machine-readable instructions and the first configuration information are associated with one or more priority partitions. Executing the second stage boot loader includes authenticating, by the one or more processors, the operating system and the first set of machine-readable instructions. Executing the second stage boot loader includes executing, by the one or more processors, the first set of machine-readable instructions in response to authentication of the operating system and the first set of machine-readable instructions.

In an embodiment, a device for initiating an engine control system of an aircraft includes one or more processors, and one or more non-transitory memory modules communicatively coupled to the one or more processors and storing machine-readable instructions that, when executed, cause the one or more processors to authenticate a first stage boot loader. When executed, the machine-readable instructions cause the one or more processors to authenticate a second stage boot loader in response to authentication of the first stage boot loader. When executed, the machine-readable instructions cause the one or more processors to execute the second stage boot loader in response to authentication of the second stage boot loader. Executing the second stage boot loader causes the one or more processors to load an operating system, a first set of machine-readable instructions, and first configuration information associated with the first set of machine-readable instructions onto a non-transitory computer-readable medium, wherein the first set of machine-readable instructions and the first configuration information are associated with one or more priority partitions. Executing the second stage boot loader causes the one or more processors to authenticate the operating system and the first set of machine-readable instructions. Executing the second stage boot loader causes the one or more processors to execute the first set of machine-readable instructions in response to authentication of the operating system and the first set of machine-readable instructions.

In an embodiment, a system includes an aircraft system. The system also includes one or more processors, and one or more non-transitory memory modules communicatively coupled to the one or more processors and storing machine-readable instructions that, when executed, cause the one or more processors to authenticate a first stage boot loader. When executed, the machine-readable instructions cause the one or more processors to authenticate a second stage boot loader in response to authentication of the first stage boot loader. When executed, the machine-readable instructions cause the one or more processors to execute the second stage boot loader in response to authentication of the second stage boot loader. Executing the second stage boot loader causes the one or more processors to load an operating system, a first set of machine-readable instructions, and first configuration information associated with the first set of machine-readable instructions onto a non-transitory computer-readable medium, wherein the first set of machine-readable instructions and the first configuration information are associated with one or more priority partitions. Executing the second stage boot loader causes the one or more processors to authenticate the operating system and the first set of machine-readable instructions. Executing the second stage boot loader causes the one or more processors to execute the first set of machine-readable instructions in response to authentication of the operating system and the first set of machine-readable instructions.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of 'a', 'an', and 'the' include plural referents unless the context clearly dictates otherwise.

BRIEF DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
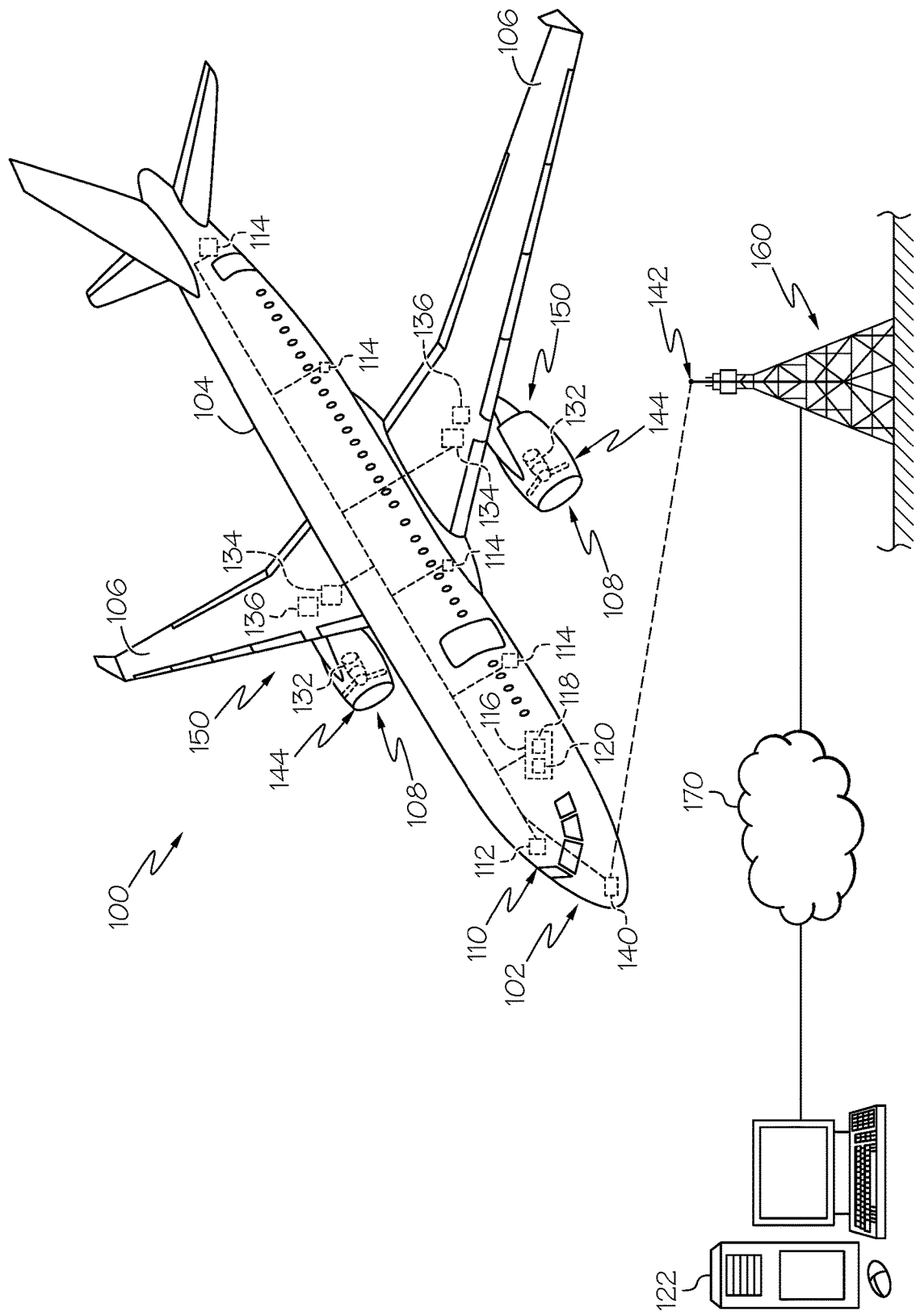
FIG. 1 schematically depicts an example aircraft system according to one or more embodiments shown and described herein.

Referring to the figures, embodiments of the present disclosure are generally related to devices, systems, and methods for securely initializing (e.g., booting) an engine control system of an aircraft system (and/or one or more other embedded systems) in stages to prevent tampering and/or to minimize the impact on engine operation. As described below in further detail, in order to securely initialize the engine control system of the aircraft system, the initializing protocol may authenticate the software programs using various cryptographic authentication techniques, thereby preventing the software programs from being subjected to, for example, malicious tampering.

While the present disclosure relates primarily to an engine control system, it should be understood that the devices, systems, and methods described herein may be used for other embedded systems in aircraft. Furthermore, the engine control systems described herein may include or be a part of an embedded system in some embodiments. Other illustrative embedded systems include, but are not limited to, a microcontroller including one or more central processing units (CPUs).

Furthermore, by initializing the engine control system of the aircraft system in stages, the engine control system can execute priority software programs related to the operation and control of the engine of the aircraft within a predetermined period of time. As a non-limiting example and as described below in further detail, the priority software programs may include machine-readable instructions for controlling the operation of the engine, such as returning the engine to normal operation. Moreover, certain software programs for controlling the operation of the engine may need to be executed within a predetermined period of time when the processing device is released from a reset state in order to prevent damage to the engine of the aircraft. Accordingly, once the processing device is released from the reset state, the priority software programs may be authenticated, loaded onto a designated memory, and initialized within the predetermined period of time.

Once the priority software programs are initialized, non-priority software programs that are unrelated to the operation and control of the engine may be authenticated, loaded onto the designated memory, and then initialized. Additional details regarding the non-priority software programs will be described herein. By executing the staged initialization protocol, the software programs can identify suspicious activity and/or evidence of tampering while simultaneously minimizing the negative impacts to the operation of the engine during the initializing protocol.

Executing the staged initialization protocol described herein improves the speed in which priority software programs for controlling the operation of the engine are loaded onto the designated memory and subsequently executed, thereby improving the operation of the engine control system of the aircraft. Furthermore, executing the staged initialization protocol described herein prevents priority software programs from executing when the priority software programs are not cryptographically authenticated, thereby improving the security of the engine control system of the aircraft.

Referring now to FIG. 1, an illustrative aircraft system 100 is schematically depicted. In the illustrated embodiment of FIG. 1, the aircraft system 100 generally includes an aircraft 102, which may include a fuselage 104, wing assemblies 106, and one or more engines 108. While FIG. 1 depicts the aircraft 102 as being a fixed-wing craft having two wing assemblies 106 with one engine 108 mounted on each wing assembly 106 (two engines 108 total), other configurations are contemplated. For example, other configurations may include more than two wing assemblies 106, more than two engines 108 (e.g., trijets, quadjets, etc.), engines 108 that are not mounted to a wing assembly 106 (e.g., mounted to the fuselage 104, mounted to the tail, mounted to the nose, etc.), non-fixed wings (e.g., rotary wing aircraft), and/or the like.

As illustrated in FIG. 1, the aircraft 102 may include the engines 108 coupled to the wing assemblies 106 and/or the fuselage 104, a cockpit 110 positioned in the fuselage 104, and the wing assemblies 106 extending outward from the fuselage 104. A control mechanism 112 for controlling the aircraft 102 is included in the cockpit 110 and may be operated by a pilot located therein. It should be understood that the term "control mechanism" as used herein is a general term used to encompass all aircraft control components, particularly those typically found in the cockpit 110.

In some embodiments, a plurality of aircraft control systems 114 that enable proper operation of the aircraft 102 may also be included in the aircraft 102, as well as an engine control system 116. The aircraft control systems 114 may generally be any systems that effect control of one or more components of the aircraft 102, such as, for example, cabin pressure controls, elevator controls, rudder controls, flap controls, spoiler controls, landing gear controls, heat exchanger controls, and/or the like. In some embodiments, the avionics of the aircraft 102 may be encompassed by one or more of the aircraft control systems 114. In various embodiments, the engine control system 116 may be operably coupled to the other controllers of the aircraft 102, the plurality of aircraft control systems 114, and the engines 108. While the embodiment depicted in FIG. 1 specifically refers to the engine control system 116 controlling the engines 108, it should be understood that other controllers may also be included within the aircraft 102 to control various other systems that do not specifically relate to the engines 108.

As shown in the illustrated embodiment of FIG. 1, the engine control system 116 may include one or more processing devices 118 and/or one or more memories 120. In some embodiments, the one or more memories 120 may include a non-transitory computer-readable medium, such as random access memory (RAM), read-only memory (ROM), flash memory, or one or more different types of portable electronic memory, such as discs, DVDs, CD-ROMs, or the like, or any suitable combination of these types of memory. The one or more processing devices 118 may carry out programming instructions stored on the one or more memories 120, thereby causing operation of the engine control system 116. That is, the one or more processing devices 118 and the one or more memories 120 within the engine control system 116 may be operable to carry out the various processes described herein with respect to the engine control system 116.

Non-limiting example processes include, but are not limited to, operating various components of the aircraft 102 (such as the engine 108 and/or components thereof), monitoring the health of various components of the aircraft 102 (e.g., the engine 108 and/or components thereof), monitoring operation of the aircraft 102 and/or components thereof, installing software programs, installing software updates, and/or the like. As another non-limiting example, the processes may include diagnosing and/or predicting one or more engine system faults in the aircraft 102. Diagnosed and/or predicted faults may include, but are not limited to, improper operation of components, failure of components, indicators of future failure of components, and/or the like.

The programming instructions run by the engine control system 116 (e.g., executed by the one or more processing devices 118 and stored within the one or more memories 120) may include a computer program product that includes machine-readable media for carrying or having machine-executable instructions or data structures. Such machine-readable media may be any available media, which can be accessed by a general purpose or special purpose computer or other machine with a processor. Generally, such a computer program may include routines, programs, objects, components, data structures, algorithms, and/or the like that have the technical effect of performing particular tasks or implementing particular abstract data types. Machine-executable instructions, associated data structures, and programs represent examples of program code for executing the exchange of information as disclosed herein. Machine-executable instructions may include, for example, instructions and data, which cause a general purpose computer, special purpose computer, or special purpose processing machine to perform a certain function or group of functions. In some embodiments, the computer program product may be provided by a component external to the engine control system 116 and installed for use by the engine control system 116. The computer program product may generally be updatable via a software update that is received from one or more components of the aircraft system 100, such as, for example, a remote computing device 122. The software is generally updated by the engine control system 116 by installing the update such that the update supplements and/or overwrites one or more portions of the existing program code for the computer program product. The software update may allow the computer program product to more accurately diagnose and/or predict faults, provide additional functionality not originally offered, and/or the like.

In some embodiments, each of the engines 108 may include a fan 144 and one or more engine sensors 130 for sensing various characteristics of the fan 144 and the engine 108 during operation of the engines 108. Illustrative examples of the one or more engine sensors 130 include, but are not limited to, a fan speed sensor 132, a temperature sensor 134, and a pressure sensor 136. The fan speed sensor 132 is generally a sensor that measures a rotational speed of the fan 144 within the engine 108. The temperature sensor 134 may be a sensor that measures a fluid temperature within the engine 108 (e.g., an engine air temperature), a temperature of fluid (e.g., air) at an engine intake location, a temperature of fluid (e.g., air) within a compressor, a temperature of fluid (e.g., air) within a turbine, a temperature of fluid (e.g., air) within a combustion chamber, a temperature of fluid (e.g., air) at an engine exhaust location, a temperature of cooling fluids and/or heating fluids used in heat exchangers in or around the engine 108, and/or the like. The pressure sensor 136 may be a sensor that measures a fluid pressure (e.g., air pressure) in various locations in and/or around the engine 108, such as, for example, a fluid pressure (e.g., air pressure) at an engine intake, a fluid pressure (e.g., air pressure) within a compressor, a fluid pressure (e.g., air pressure) within a turbine, a fluid pressure (e.g., air pressure) within a combustion chamber, a fluid pressure (e.g., air pressure) at an engine exhaust location, and/or the like.

In some embodiments, each of the engines 108 may have a plurality of engine sensors 130 associated therewith (including one or more fan speed sensors 132, one or more temperature sensors 134, and/or one or more pressure sensors 136). That is, more than one of the same type of engine sensor 130 may be used to sense characteristics of an engine 108 (e.g., an engine sensor 130 for each of the different areas of the same engine 108). In some embodiments, one or more of the engine sensors 130 may be utilized to sense characteristics of more than one of the engines 108 (e.g., a single engine sensor 130 may be used to sense characteristics of two engines 108). The engines 108 may further include additional components not specifically described herein, and may include one or more additional engine sensors 130 incorporated with or configured to sense such additional components in some embodiments.

In embodiments, each of the engine sensors 130 (including, but not limited to, the fan speed sensors 132, the temperature sensors 134, and the pressure sensors 136) may be communicatively coupled to one or more components of the aircraft 102 such that signals and/or data pertaining to one or more sensed characteristics are transmitted from the engine sensors 130 for the purposes of determining, detecting, and/or predicting a fault, as well as completing one or more other actions in accordance with software programming that requires sensor information. As indicated by the dashed lines extending between the various engine sensors 130 (e.g., the fan speed sensors 132, the temperature sensors 134, and the pressure sensors 136) and the aircraft control systems 114 and the engine control system 116 in the embodiment depicted in FIG. 1, the various engine sensors 130 may be communicatively coupled to the aircraft control systems 114 and/or the engine control system 116 in some embodiments. As such, the various engine sensors 130 may be communicatively coupled via wires or wirelessly to the aircraft control systems 114 and/or the engine control system 116 to transmit signals and/or data to the aircraft control systems 114 and/or the engine control system 116.

As a non-limiting example, while the aircraft 102 is being operated, the control mechanism 112 may be utilized to operate one or more of the aircraft control systems 114. Various engine sensors 130, including, but not limited to, the fan speed sensors 132, the temperature sensors 134, and/or the pressure sensors 136 may output data relevant to various characteristics of the engine 108 and/or the other aircraft control systems 114. The engine control system 116 may utilize inputs from the control mechanism 112, the fan speed sensors 132, the temperature sensors 134, the pressure sensors 136, the various aircraft control systems 114, one or more databases, and/or information from airline control, flight operations, or the like to diagnose, detect, and/or predict faults. Once a fault has been diagnosed, detected, and/or predicted, an indication may be provided on the aircraft 102 and/or to the ground system 160.

In the illustrated embodiment, the aircraft system 100 may include an interconnectivity of components coupled via a network 170, which may include a wide area network, such as the internet, a local area network (LAN), a mobile communications network, a public service telephone network (PSTN) and/or other network and may be configured to electronically connect components. The illustrative components that may be connected via the network 170 include, but are not limited to, a ground system 160 in communication with an aircraft 102 (e.g., via the ground wireless communications link 142 and the aircraft wireless communications link 140) and the remote computing device 122 configured to, for example, provide software updates to various components of the aircraft system 100 may transmit data such that data and/or information pertaining to the fault may be transmitted off the aircraft 102. The aircraft wireless communications link 140 may generally be any air-to-ground communication system now known or later developed. Illustrative examples of the aircraft wireless communications link 140 include, but are not limited to, a transponder, a very high frequency (VHF) communication system, an aircraft communications addressing and reporting system (ACARS), a controller-pilot data link communications (CPDLC) system, a future air navigation system (FANS), and/or the like.

In some embodiments, the ground system 160 may be a transmission system located on the ground that is capable of transmitting and/or receiving signals to/from the aircraft 102. That is, the ground system 160 may include a ground wireless communications link 142 that is communicatively coupled to the aircraft wireless communications link 140 wirelessly to transmit and/or receive signals and/or data. As a non-limiting example, the ground system 160 may be an air traffic control (ATC) tower and/or one or more components or systems thereof. Accordingly, the ground wireless communications link 142 may be a VHF communication system, an ACARS unit, a CPDLC system, FANS, and/or the like. Using the ground system 160 and the aircraft wireless communications link 140, the various non-aircraft components depicted in the embodiment of FIG. 1 may be communicatively coupled to the aircraft 102, even in instances where the aircraft 102 is airborne and in flight, thereby allowing for communication of faults detected by the engine control system 116 and on-demand transmission of software and/or software updates whenever such software and/or software updates may be needed. However, it should be understood that the embodiment depicted in FIG. 1 is merely illustrative. In other embodiments, the aircraft 102 may be communicatively coupled to the various other components of the aircraft system 100 when on the ground and physically coupled to one of the components of the aircraft system 100.

While an example aircraft 102 has been described and illustrated in FIG. 1, the aircraft 102 may have other configurations and/or may be other aerial vehicles in other embodiments. As a non-limiting example, the aircraft 102 may be a high speed compound rotary-wing aircraft with supplemental translational thrust systems, an aircraft with dual contra-rotating propellers, an aircraft with a coaxial rotor system, an aircraft with a turboprop engine, a tilt-rotor aircraft, a tilt-wing aircraft, a conventional take-off and landing aircraft, and other turbine-driven machines in other embodiments.

While the embodiment of FIG. 1 specifically relates to components within an aircraft 102, the present disclosure is not limited to such. That is, the various components depicted with respect to the aircraft 102 may be incorporated within various other types of craft. For example, the various components described herein with respect to the aircraft 102 may be present in watercraft, spacecraft, and/or the like without departing from the scope of the present disclosure.

Figure 2:
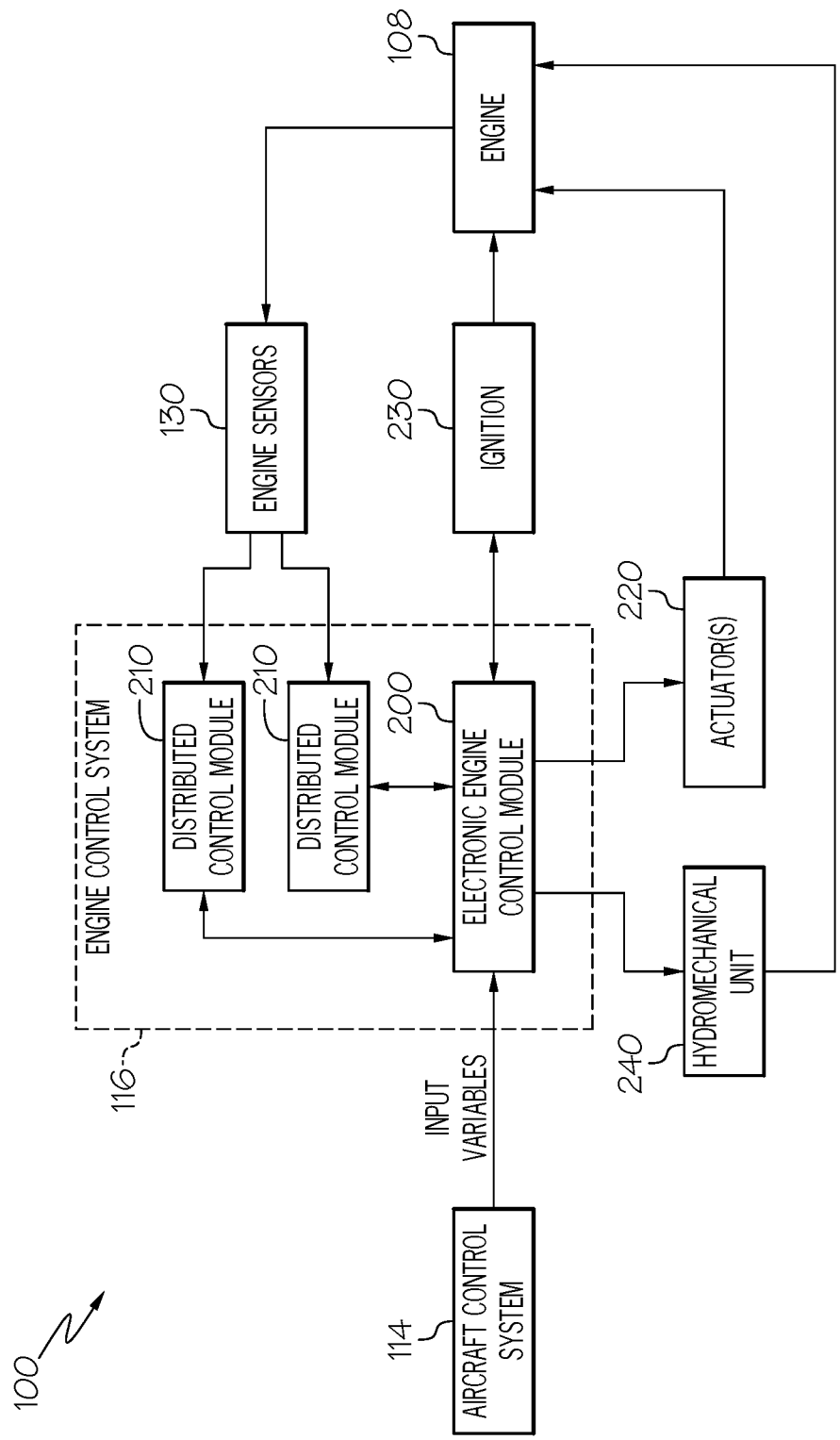
FIG. 2 schematically depicts a functional block diagram of illustrative internal components of an aircraft system according to one or more embodiments shown and described herein.

With reference to FIG. 2, functional block diagram including the engine control system 116 is schematically depicted. As illustrated in FIG. 2, the engine control system 116 may be, but is not limited to, a full authority digital engine control (FADEC) system. The FADEC system generally has full authority over operating parameters of the engines 108 and cannot be manually overridden. The operating parameters of the FADEC system can be modified by installing and/or updating software. As such, the FADEC system can be programmatically controlled to determine engine limitations, receive engine health reports, and receive engine maintenance reports and/or the like to undertake certain measures and/or actions in certain conditions.

In some embodiments, the engine control system 116 includes an electronic engine controller module (EECM) 200, as well as one or more distributed control modules (DCMs) 210 configured to control various aspects of performance of the engines 108. While the illustrated embodiment depicts two DCMs 210, it should be understood that any number of DCMs 210 may be included within the engine control system 116 in other embodiments.

As described above, the engine sensors 130 may output data relevant to various characteristics of the engine 108. The engine control system 116 may utilize inputs from the fan speed sensors 132, the temperature sensors 134, the pressure sensors 136, or the like to diagnose, detect, and/or predict faults. As non-limiting examples, the engine control system 116 may analyze the data output by the engine sensors 130 (e.g., the fan speed sensors 132, the temperature sensors 134, the pressure sensors 136, etc.), over a period of time to determine drifts, trends, steps, or spikes in the operation of the engines 108.

In some embodiments, the engine control system 116 may receive a plurality of input variables of a current flight condition, including, but not limited to, air density, throttle lever position, and/or the like from the aircraft control system 114. The inputs are received, analyzed, and used to determine operating parameters such as, but not limited to, fuel flow, stator vane position, bleed valve position, and/or the like. As a non-limiting example, in response to receiving a signal indicating a change in the throttle lever position, the engine control system 116 may output a signal causing one or more actuators 220 to adjust a parameter of the engine 108 accordingly. As another non-limiting example, in response to receiving an input variable corresponding to turning on or turning off the engine 108, the engine control system 116 may activate or deactivate the engines 108 by controlling an ignition 230. As yet another non-limiting example, the engine control system 116 may output a signal to control a hydromechanical fuel unit 240 in response to receiving an input variable corresponding to adjusting an amount of fuel provided to the engine 108.

While not illustrated in FIG. 2, it should be understood that the engine control system 116 may be in communication with other components of the aircraft 102. As non-limiting examples, the engine control system 116 may be communicatively coupled to an alternator, reverser solenoids and switches, engine condition monitoring signals, and/or the like in some embodiments.

Figure 3:
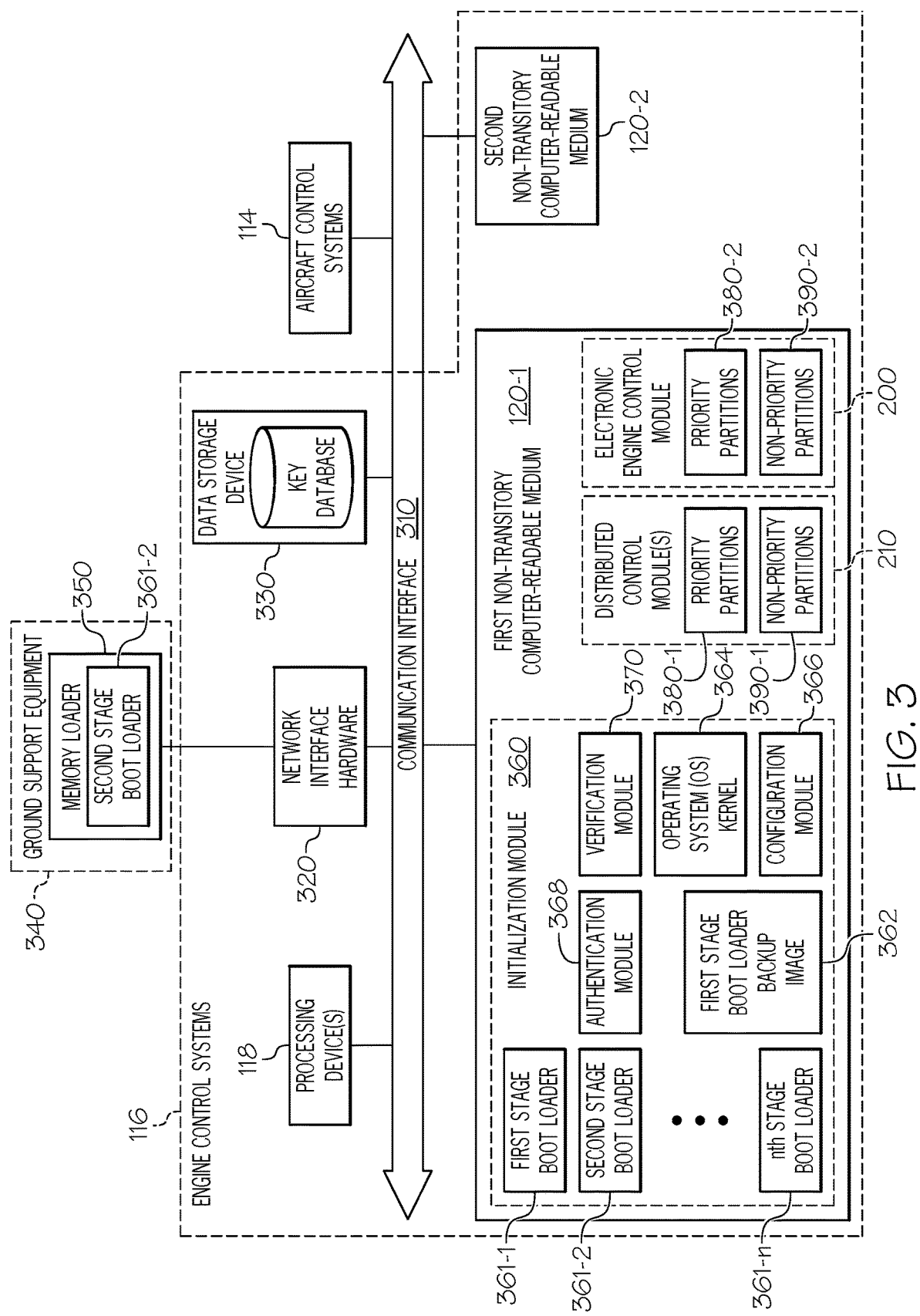
FIG. 3 schematically illustrates a functional block diagram of illustrative modules contained within the engine control system according to one or more embodiments shown and described herein.

Referring now to FIG. 3, an example embodiment of the engine control system 116 is schematically depicted showing additional hardware components contained therein. The engine control system 116 generally includes the one or more processing devices 118, a first memory 120-1 a second memory 120-2 of the one or more memories 120, a communication interface 310, network interface hardware 320, and a data storage device 330. The components of the engine control system 116 may be physically and/or communicatively coupled through the communication interface 310. While the illustrated embodiment of FIG. 3 illustrates the first memory 120-1 and the second memory 120-2, it should be understood that the engine control system 116 may have any number of memory components. As a non-limiting example, the first memory 120-1 and the second memory 120-2 may be replaced with a single memory component in some embodiments.

The communication interface 310 is formed from any medium that is configured to transmit a signal. As non-limiting examples, the communication interface 310 is formed of conductive wires, conductive traces, optical waveguides, or the like. The communication interface 310 may also refer to the expanse in which electromagnetic radiation and their corresponding electromagnetic waves are propagated. Moreover, the communication interface 310 may be formed from a combination of mediums configured to transmit signals. In one embodiment, the communication interface 310 includes a combination of conductive traces, conductive wires, connectors, and buses that cooperate to permit the transmission of electrical data signals to and from the various components of the engine control system 116. Additionally, it is noted that the term "signal" means a waveform (e.g., electrical, optical, magnetic, mechanical or electromagnetic) configured to travel through a medium, such as DC, AC, sinusoidal-wave, triangular-wave, square-wave, vibration, and the like.

The network interface hardware 320 may include and/or be configured to communicate with any wired or wireless networking hardware, including an antenna, a modem, a LAN port, a wireless fidelity (Wi-Fi) card, a WiMax card, a long term evolution (LTE) card, a ZigBee card, a Bluetooth chip, a USB card, mobile communications hardware, and/or other hardware for communicating with other networks and/or devices. As a non-limiting example, the network interface hardware 320 may include hardware enabling the engine control system 116 to communicate with ground support equipment (GSE) 340 and/or a memory loader 350 of the GSE 340. As used herein, the GSE 340 refers to external equipment used to support and test the engine control system 116 and/or other components of the aircraft 102. As a non-limiting example, the memory loader 350 of the GSE 340 may be configured to provide software updates to the engine control system 116 and download data obtained by the engine control system 116 during a flight. As another non-limiting example, the GSE 340 may include production support equipment for restricted data monitoring, test support equipment for comprehensive data monitoring and changing adjustable parameters, and integration test rigs for system and software testing. In some embodiments, the GSE 340 may be connected to the engine control system 116 via the ground system 160 and the aircraft wireless communications link 140.

The data storage device 330, which includes a key database 355, is communicatively coupled to the one or more processing devices 118. As a non-limiting example, the data storage device 330 may include one or more database servers that support NoSQL, MySQL, Oracle, SQL Server, NewSQL, or the like. As described below in further detail with reference to FIGS. 4-7, the key database 355 may include a plurality of private and/or public keys that are utilized to cryptographically authenticate the engine control system 116 during an initialization protocol.

As described above, the one or more processing devices 118, each of which may be a computer processing unit (CPU), may receive and execute machine-readable instructions stored in the first memory 120-1 and the second memory 120-2. As a non-limiting example, the one or more processing devices 118 may be one of a shared processor circuit, dedicated processor circuit, or group processor circuit. As described herein, the term "shared processor circuit" refers to a single processor circuit that executes some or all machine-readable instructions from the multiple modules. As described herein, the term "group processor circuit" refers to a processor circuit that, in combination with additional processor circuits, executes some or all machine-executable instructions from the multiple modules of the memories 120. References to multiple processor circuits encompass multiple processor circuits on discrete dies, multiple processor circuits on a single die, multiple cores of a single processor circuit, multiple threads of a single processor circuit, or a combination of the above.

The first memory 120-1 and the second memory 120-2 are communicatively coupled to the one or more processing devices 118. As a non-limiting example, each of the first memory 120-1 and the second memory 120-2 may be one of a shared memory circuit, dedicated memory circuit, or group memory circuit. As described herein, the term "shared memory circuit" refers to a single memory circuit that stores some or all machine-readable instructions from multiple modules, which are described below in further detail. As described herein, the term "group memory circuit" refers to a memory circuit that, in combination with additional memories, stores some or all machine-readable instructions from the multiple modules. Non-limiting examples of the first memory 120-1 and the second memory 120-2 include random access memory (including SRAM, DRAM, and/or other types of random access memory), read-only memory (ROM), flash memory, registers, compact discs (CD), digital versatile discs (DVD), and/or other types of storage components.

As shown in FIG. 3, the first memory 120-1 includes a plurality of logic modules. Each of the logic modules may be embodied as a computer program, firmware, or hardware, as an example. An illustrative example of a logic module includes, but is not limited to, an initialization module 360. In some embodiments, the initialization module 360 includes a plurality of boot stage loaders 361, a first stage boot loader backup image 362, an operating system (OS) kernel 364, a configuration module 366, an authentication module 368, and a verification module 370. Additional illustrative examples of the logic modules include the one or more DCMs 210 and the EECM 200. Each of the logic modules may include one or more programming instructions that are executable by the one or more processing devices 118, such as the processes described in FIGS. 4-7.

With continued reference to FIG. 3, the engine control system 116 is illustrated as being turned off or in a state immediately after the engine control system 116 is reset via a hardware or software command. Initially, the first memory 120-1 stores the initialization module 360, the one or more DCMs 210, and the EECM 200. Once the engine control system 116 is turned on and/or released from reset, the engine control system 116 may initialize a staged initialization protocol in order to load the one or more DCMs 210 and the EECM 200 onto the second memory 120-2 for subsequent execution by the one or more processing devices 118. As described below in further detail with reference to FIGS. 4-7, when the initialization module 360 is executed, the one or more processing devices 118 may cryptographically authenticate and/or verify a first set of machine-readable instructions associated with priority partitions 380-1, 380-2 (collectively referred to as priority partitions 380) of the DCMs 210 and the EECM 200, respectively, prior to loading the first set of machine-readable instructions onto the second memory 120-2. Additionally and as described below in further detail, when the initialization module 360 is executed, the one or more processing devices 118 may cryptographically authenticate and/or verify the configuration information associated with first set of machine-readable instructions.

Once the first set of machine-readable instructions are initialized, the one or more processing devices 118 may cryptographically authenticate and/or verify a second set of machine-readable instructions associated with non-priority partitions 390-1, 390-2 (collectively referred to as non-priority partitions 390) of the DCMs 210 and the EECM 200, respectively, prior to loading the second set of machine-readable instructions onto the second memory 120-2. Likewise, when the initialization module 360 is executed, the one or more processing devices 118 may cryptographically authenticate and/or verify the configuration information associated with second set of machine-readable instructions. By executing the staged initialization protocol, the initialization module 360 can identify suspicious activity and/or evidence of tampering while simultaneously minimizing the negative impacts to the operation of the engine 108 during an initializing protocol.

While the above embodiment describes loading the machine-readable instructions from the first memory 120-1 to the second memory 120-2, it should be understood that in other embodiments, the machine-readable instructions may be loaded from a first portion of the first memory 120-1 to a second portion of the first memory 120-1 (i.e., the first memory 120-1 is a group memory circuit).

Figure 4:
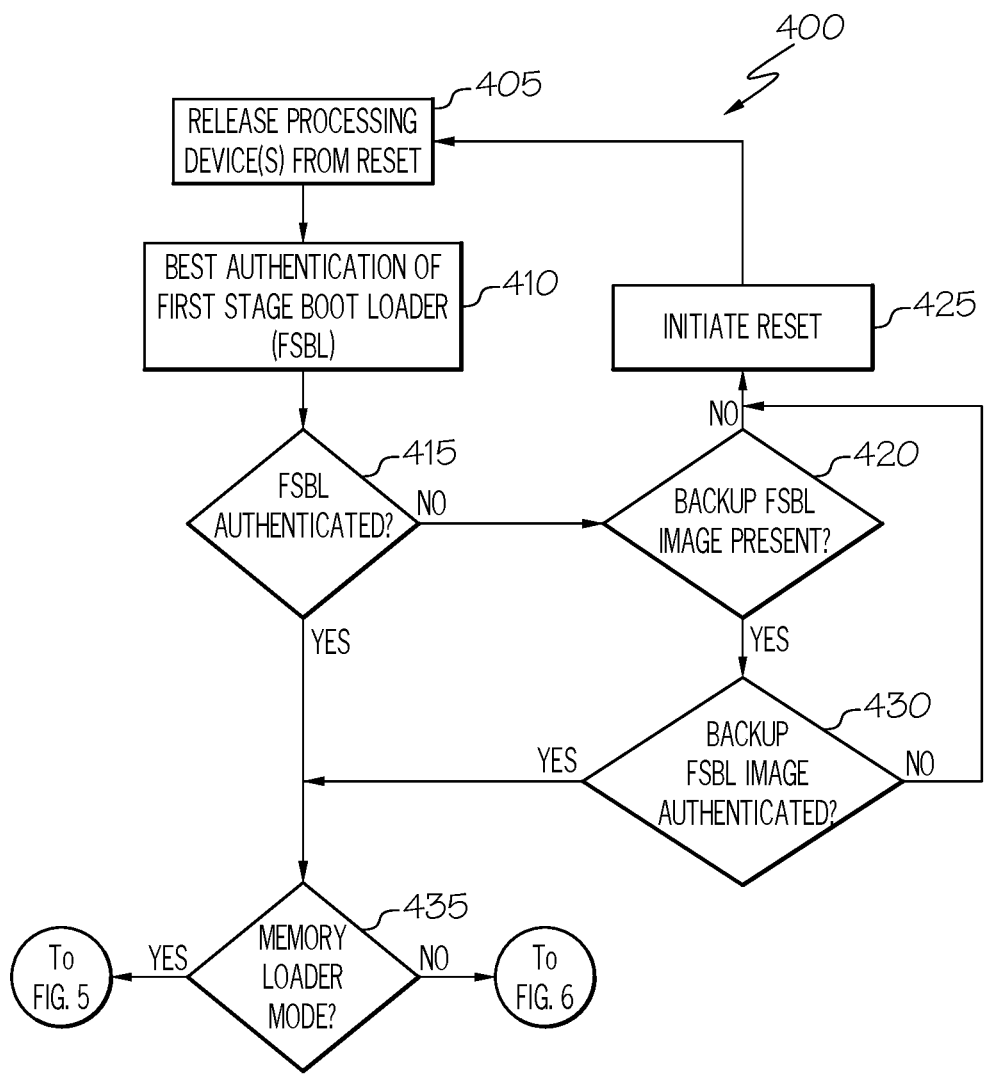
FIG. 4 depicts a flow diagram of an illustrative method of authenticating a first stage boot loader module of the engine control system according to one or more embodiments shown and described herein.

With reference to FIGS. 4-7, flow diagrams of an illustrative method 400 of executing the staged initialization protocol are depicted. Referring to FIGS. 3-4, at block 405, the engine control system 116 releases the one or more processing devices 118 from reset via a hardware or software command (e.g., the engine control system 116 is released from reset once a power supply and clock source (not shown) of the engine control system 116 are stable after the hardware or software reset command). At block 410, the one or more processing devices 118 begin authenticating a first stage boot loader 361-1 by executing the programming instructions of the authentication module 368. Furthermore, at block 415, the one or more processing devices 118 determine whether the first stage boot loader 361-1 is authenticated by executing the programming instructions of the authentication module 368.

By executing the programming instructions of the authentication module 368 at block 410 and block 415, the one or more processing devices 118 perform various cryptographic authentication algorithms including, but not limited to, symmetric key encryption (e.g., 256-bit symmetric encryption, 3DES, AES, etc.), asymmetric key encryption (e.g., 4096-bit asymmetric encryption, RSA, ECDSA, etc.), and/or hashing algorithms (384-bit hash, HMAC-SHA256, etc.).

As a non-limiting example, the one or more processing devices 118 may generate a public key (i.e., an arbitrary bit string) or obtain a pre-generated public key (e.g., a key that is pre-generated and provisioned as part of a manufacturing process), encrypt the first stage boot loader 361-1 with the public key, and authenticate the first stage boot loader 361-1 if it corresponds to a private key stored in the key database 355. In some embodiments, the public key may correspond to the private key if the one or more processing devices 118 can decrypt the contents of the first stage boot loader 361-1 using the private key. If the public key corresponds to the private key stored in the key database 355, the one or more processing devices 118 may determine that the first stage boot loader 361-1 is authenticated and has not been subjected to tampering, and the one or more processing devices 118 may continue the staged initialization protocol. Otherwise, if the public key does not correspond to the private key stored in the key database 355, the one or more processing devices 118 will not be able to decrypt the first stage boot loader 361-1, thereby causing the one or more processing devices 118 to determine that the first stage boot loader 361-1 is not authenticated. Moreover, the one or more processing devices 118 may determine that the first stage boot loader 361-1 was subjected to tampering in response to the public key not corresponding to the private key.

As another non-limiting example, the one or more processing devices 118 may generate a public key (i.e., an arbitrary bit string) or receive a pre-generated public key (e.g., a key that is pre-generated and provisioned as part of a manufacturing process), and transmit the public key to the key database 355. Further, the one or more processing devices 118 may encrypt the first stage boot loader 361-1 with the public key and determine whether the public key corresponds to an entry in the key database 355 (i.e., determine whether the public key was successfully transmitted to the key database 355). If the public key corresponds to an entry in the key database 355, the one or more processing devices 118 may decrypt the first stage boot loader 361-1. Accordingly, the one or more processing devices 118 may then determine that the first stage boot loader 361-1 is authenticated and has not been subjected to tampering, and the one or more processing devices 118 may continue the staged initialization protocol. Otherwise, if the generated (or received) public key does not correspond to an entry in the key database 355, the one or more processing devices 118 will not be able to decrypt the first stage boot loader 361-1, thereby causing the one or more processing devices 118 to determine that the first stage boot loader 361-1 is not authenticated. Moreover, the one or more processing devices 118 may determine that the first stage boot loader 361-1 was subjected to tampering in response to the public key not corresponding to an entry in the key database 355.

If the one or more processing devices 118 determine that the first stage boot loader 361-1 is not authenticated at block 415, the method 400 proceeds to block 420; otherwise, the method 400 proceeds to block 435. At block 420, the one or more processing devices 118 determine whether the initialization module 360 includes the first stage boot loader backup image 362 (i.e., a copy of the first stage boot loader 361-1). If so, the method 400 proceeds to block 430; otherwise, the method 400 proceeds to block 425, where the engine control system 116 is reset and then proceeds to block 405. In some embodiments, the engine control system 116 temporarily discontinues receiving electrical power from a power supply (not shown) and removes any machine-readable instructions stored on the second memory 120-2 when the engine control system 116 is reset.

At block 430, the one or more processing devices 118 determine whether the first stage boot loader backup image 362 is authenticated by executing the programming instructions of the authentication module 368. As described above, the one or more processing devices 118 perform various cryptographic authentication algorithms including, but not limited to, symmetric key encryption, asymmetric key encryption, and/or hashing algorithms to authenticate whether the first stage boot loader backup image 362. If the first stage boot loader backup image 362 is authenticated at block 430, the method 400 proceeds to block 435; otherwise, the method 400 proceeds to block 425.

At block 435, the one or more processing devices 118 begin executing the first stage boot loader 361-1. In the illustrated embodiment, executing the first stage boot loader 361-1 includes determining whether the engine control system 116 is in a memory loader mode. As described herein, the engine control system 116 is in the memory loader mode when the engine control system 116 is connected to the memory loader 350 of the GSE 340 via the network interface hardware 320. If the engine control system 116 is in the memory loader mode, the method 400 proceeds to block 505 illustrated in FIG. 5; otherwise, the method 400 proceeds to block 605 illustrated in FIG. 6.

It should be understood that in other embodiments, beginning the execution of the first stage boot loader 361-1 (i.e., block 435 in FIG. 4) may include and/or be preceded by other functions. As non-limiting examples, executing the first stage boot loader 361-1 may be preceded by a power on self test (POST) of the engine control system 116.

Figure 5:
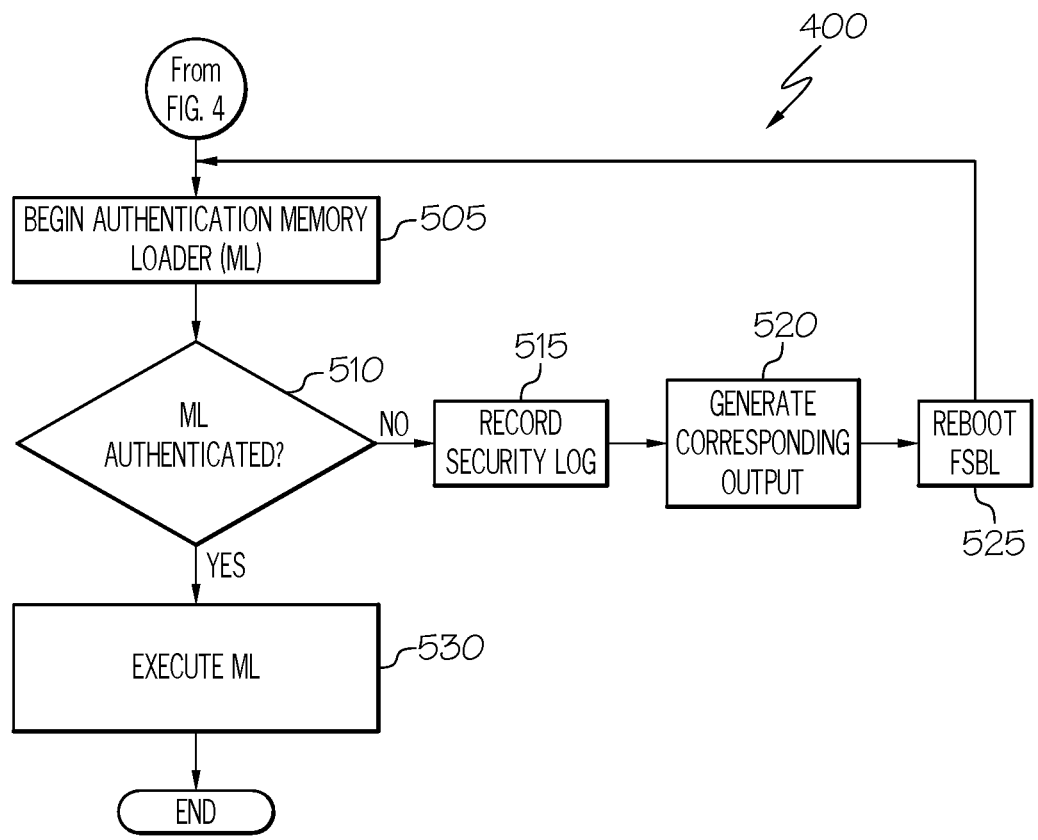
FIG. 5 depicts a flow diagram of an illustrative method of authenticating a memory loader module in communication with the engine control system according to one or more embodiments shown and described herein.

With reference to FIGS. 3 and 5, at block 505 (i.e., when block 435 in FIG. 4 determines the engine control system 116 is in the memory loader mode), the one or more processing devices 118 begin authenticating the memory loader 350 by executing the programming instructions of the authentication module 368. Furthermore, at block 510, the one or more processing devices 118 determine whether the memory loader 350 is authenticated by executing the programming instructions of the authentication module 368. By executing the programming instructions of the authentication module 368 at block 505 and block 510, the one or more processing devices 118 perform various cryptographic authentication algorithms including, but not limited to, symmetric key encryption, asymmetric key encryption, and/or hashing algorithms.

If the memory loader 350 is authenticated at block 510, the method 400 proceeds to block 530, where the one or more processing devices 118 execute the memory loader 350. The method 400 then ends. Still referring to FIGS. 3 and 5, if the memory loader 350 is not authenticated at block 510, the method 400 proceeds to block 515. At block 515, the one or more processing devices 118 record a security log indicating the failed authentication of the memory loader 350 and then generate a corresponding output at block 520. In some embodiments, the corresponding output may be a hardware output consistent with a FADEC standard and/or protocol. In other embodiments, the corresponding output may be other hardware outputs, such as an activation of a light-emitting diode (LED) circuit and/or other similar circuits of the engine control system 116.

At block 525, the one or more processing devices 118 reboot the first stage boot loader 361-1, and then the method 400 proceeds to block 505. As a non-limiting example, rebooting the first stage boot loader 361-1 may include executing machine-readable instructions that cause one or more processing devices 118 to repeat the authentication of the memory loader 350 described at block 505 and block 510. Accordingly, in some embodiments, the method 400 may not complete the staged initialization protocol if the memory loader 350 is not authenticated, thereby enhancing the security of the engine control system 116 by preventing an unauthenticated external device from initializing and/or manipulating the engine control system 116.

Figure 6:
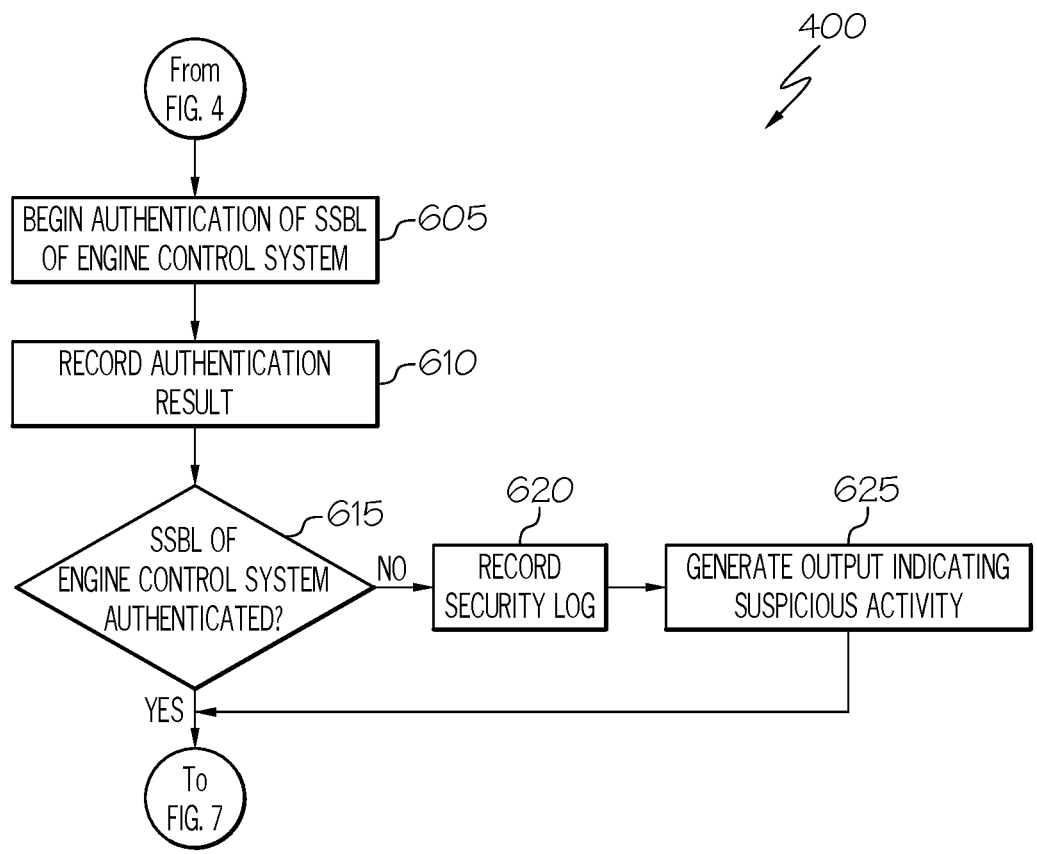
FIG. 6 depicts a flow diagram of an illustrative method of authenticating a second stage boot loader module of the engine control system according to one or more embodiments shown and described herein.

Referring now to FIGS. 3 and 6, at block 605 (i.e., when block 435 in FIG. 4 determines the engine control system 116 is not in the memory loader mode), the one or more processing devices 118 begin authenticating the second stage boot loader 361-2 by executing the programming instructions of the authentication module 368. By executing the programming instructions of the authentication module 368 at block 605, the one or more processing devices 118 perform various cryptographic authentication algorithms including, but not limited to, symmetric key encryption, asymmetric key encryption, and/or hashing algorithms.

As a non-limiting example, the one or more processing devices 118 may generate a public key (i.e., an arbitrary bit string) or receive a pre-generated public key (e.g., a key that is pre-generated and provisioned as part of a manufacturing process), encrypt the second stage boot loader 361-2 with the public key, and authenticate the second stage boot loader 361-2 if it corresponds to a private key stored in the key database 355. In some embodiments, the public key may correspond to the private key if the one or more processing devices 118 can decrypt the contents of the second stage boot loader 361-2 using the private key. If the public key corresponds to the private key stored in the key database 355, the one or more processing devices 118 may determine that the second stage boot loader 361-2 is authenticated and has not been subjected to tampering, and the one or more processing devices 118 may continue the staged initialization protocol. Otherwise, if the public key does not correspond to the private key stored in the key database 355, the one or more processing devices 118 will not be able to decrypt the second stage boot loader 361-2, thereby causing the one or more processing devices 118 to determine that the second stage boot loader 361-2 is not authenticated. Moreover, the one or more processing devices 118 may determine that the second stage boot loader 361-2 was subjected to tampering in response to the public key not corresponding to the private key.

As another non-limiting example, the one or more processing devices 118 may generate a public key (i.e., an arbitrary bit string) or receive a pre-generated public key (e.g., a key that is pre-generated and provisioned as part of a manufacturing process), transmit the public key to the key database 355, encrypt the second stage boot loader 361-2 with the public key, and determine whether the public key corresponds to an entry in the key database 355 (i.e., determine whether the public key was successfully transmitted to the key database 355). If the public key corresponds to an entry in the key database 355, the one or more processing devices 118 may decrypt the second stage boot loader 361-2. Accordingly, the one or more processing devices 118 may then determine that the second stage boot loader 361-2 is authenticated and has not been subjected to tampering, and the one or more processing devices 118 may continue the staged initialization protocol. Otherwise, if the generated (or received) public key does not correspond to an entry in the key database 355, the one or more processing devices 118 will not be able to decrypt the second stage boot loader 361-2, thereby causing the one or more processing devices 118 to determine that the second stage boot loader 361-2 is not authenticated. Moreover, the one or more processing devices 118 may determine that the second stage boot loader 361-2 was subjected to tampering in response to the public key not corresponding to an entry in the key database 355.

At block 610, the one or more processing devices 118 record the authentication result obtained at block 605. At block 615, the one or more processing devices 118 determine whether the second stage boot loader 361-2 was authenticated. If so, the method 400 proceeds to block 620, where the one or more processing devices 118 record a security log indicating the failed authentication of the second stage boot loader 361-2. At block 625, the one or more processing devices 118 generate an output indicating potential suspicious activity at block 625 (e.g., a hardware output, such as an activation of an LED circuit and/or other similar circuits of the engine control system 116) and then proceeds to block 705 in FIG. 7. Accordingly, in some embodiments, the staged initialization protocol may be completed when the second stage boot loader 361-2 is not authenticated, and an operator of the aircraft 102 may be notified of the failed authentication based on the hardware output at block 625. In some embodiments, the authentication result of the second stage boot loader 361-2 illustrated in FIG. 6 may be utilized by the engine control system 116 to determine a channel health of the engine control system 116, which may indicate a redundancy of the engine control system 116.

Figure 7:
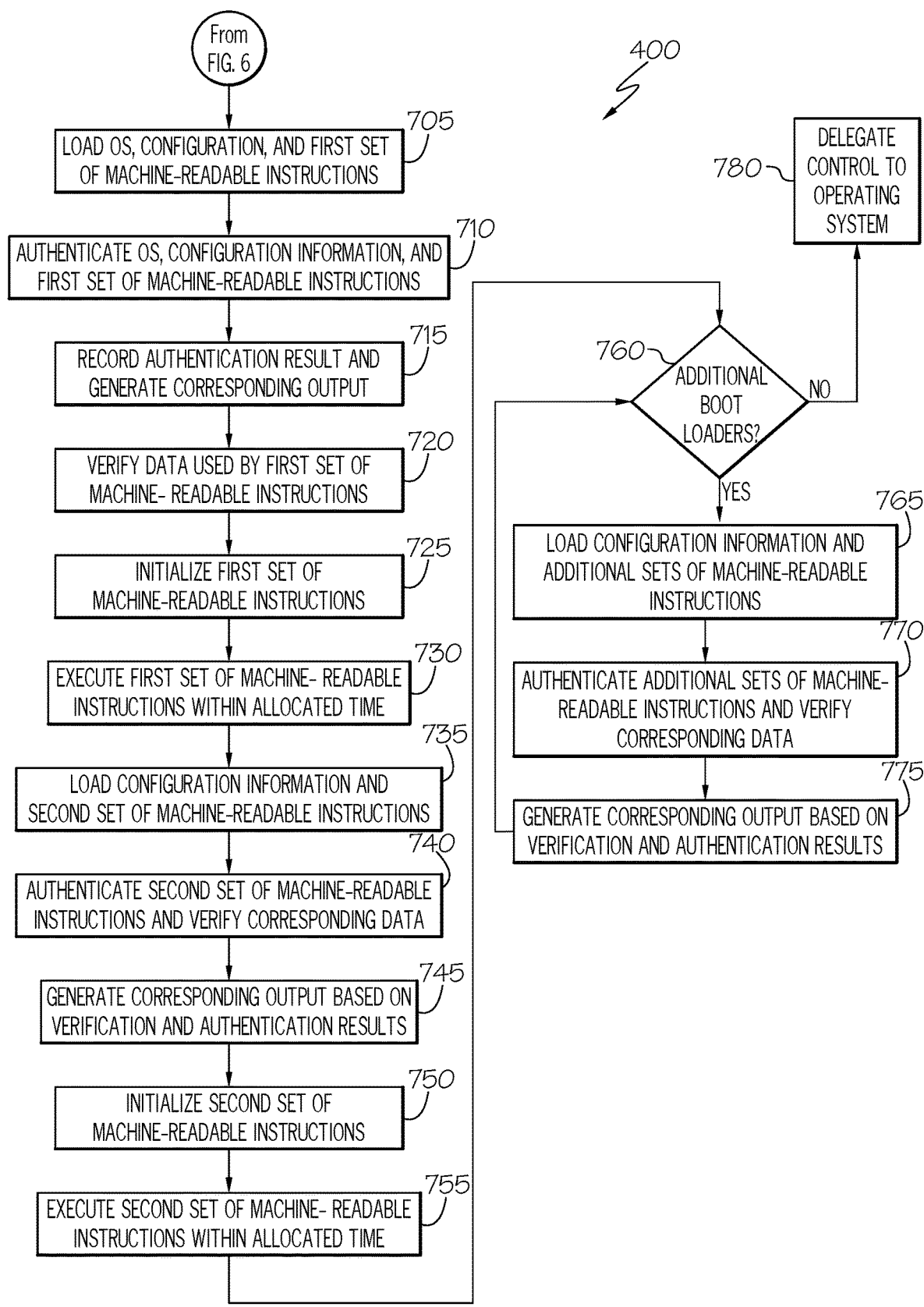
FIG. 7 depicts a flow diagram of an illustrative method of executing a second stage boot loader module of the engine control system according to one or more embodiments shown and described herein.

With reference to FIGS. 3 and 7, an illustrative overview of executing the second stage boot loader 361-2 is depicted. As described above, executing the second stage boot loader 361-2 begins in response to authenticating the first stage boot loader 361-1 (as illustrated in FIGS. 3 and 4) and authenticating the memory loader 350 (as illustrated in FIGS. 3 and 5). Furthermore, executing the second stage boot loader 361-2 begins in response to authenticating the first stage boot loader 361-1 (as illustrated in FIGS. 3 and 4) and authentication of the second stage boot loader 361-2 (as illustrated in FIGS. 3 and 6).

Referring now to FIGS. 3 and 7, at block 705 illustrated in FIG. 7, one or more processing devices 118 load the operating system onto the second memory 120-2 by executing the OS kernel 364. Furthermore, at block 705, the one or more processing devices 118 load a first set of machine-readable instructions associated with the priority partitions 380 onto the second memory 120-2. As used herein, the first set of machine-readable instructions associated with the priority partitions 380 refer to machine-readable instructions related to controlling the engine 108, such as returning the engine 108 to normal operation when the one or more processing devices 118 are released from reset.

Additionally, at block 705, the one or more processing devices 118 load configuration information associated with the first set of machine-readable instructions by executing the configuration module 366. As used herein, configuration information refers to digital signatures associated with the machine-readable instructions and a verification method to be employed for verifying data utilized by the machine-readable instructions and data stored in the data storage device 330.

At block 710, the one or more processing devices 118 authenticate the operating system, the configuration information, and the first set of machine-readable instructions. As non-limiting examples, the one or more processing devices 118 may perform the authentication using various cryptographic authentication algorithms including, but not limited to, symmetric key encryption, asymmetric key encryption, hashing algorithms, and/or the like. At block 715, the one or more processing devices 118 records the authentication result and generates a corresponding output.

At block 720, the one or more processing devices 118 verify the data utilized by the first set of machine-readable instructions by executing the verification module 370. As non-limiting examples, the verification module 370 may include instructions corresponding to a data type validation, a range and constraint validation, a code and cross-reference validation, a structured validation, and/or any other suitable data verification methods. At block 725, the one or more processing devices 118 initialize the first set of machine-readable instructions and then execute the first set of machine-readable instructions within an allocated time at block 730. By executing the first set of machine-readable instructions within an allocated period of time (i.e., a predetermined period of time), the engine 108 is less prone to damage during the staged initialization protocol, as critical engine control software can be executed during the staged initialization protocol.

In response to the allocated period of time elapsing, the one or more processing devices 118 load a second set of machine-readable instructions associated with the non-priority partitions 390 onto the second memory 120-2 at block 735. As used herein, the second set of machine-readable instructions associated with the non-priority partitions 390 refers to machine-readable instructions unrelated to controlling the engine 108, such as monitoring engine health, computing maximum available power, and component health. In addition, at block 735, the one or more processing devices 118 load configuration information associated with the second set of machine-readable instructions onto the second memory 120-2 by executing the configuration module 366.

At block 740, the one or more processing devices 118 authenticate the second set of machine-readable instructions. As non-limiting examples, the one or more processing devices 118 may perform the authentication using various cryptographic authentication algorithms including, but not limited to, symmetric key encryption, asymmetric key encryption, hashing algorithms, and/or the like. Furthermore, at block 740, the one or more processing devices 118 verify the data utilized by the second set of machine-readable instructions by executing the verification module 370.

At block 745, the one or more processing devices 118 generate an output corresponding to the verification and authentication results. In some embodiments, the corresponding output may be a hardware output consistent with a FADEC standard and/or protocol. In other embodiments, the corresponding output may be other hardware outputs, such as an activation of a light-emitting diode (LED) circuit and/or other similar circuits of the engine control system 116.

At block 750, the one or more processing devices 118 initialize the second set of machine-readable instructions and then execute the second set of machine-readable instructions within an allocated time at block 755. By executing the second set of machine-readable instructions within an allocated predetermined period of time, the staged initialization protocol can be completed within a suitable period of time, thereby enabling the engine control system 116 to perform the functionality described herein.

At block 760, the one or more processing devices 118 determine whether additional boot loaders 361 are located on the first memory 120-1 (e.g., a third boot loader). If so, the method 400 proceeds to block 765, where the one or more processing devices 118 load an additional set of machine-readable instructions onto the second memory 120-2 and configuration information associated with the additional set of machine-readable instructions. At block 770, the one or more processing devices 118 authenticate the additional set of machine-readable instructions. As non-limiting examples, the one or more processing devices 118 may perform the authentication using various cryptographic authentication algorithms including, but not limited to, symmetric key encryption, asymmetric key encryption, hashing algorithms, and/or the like. Furthermore, at block 775, the one or more processing devices 118 verify the data utilized by the additional set of machine-readable instructions by executing the verification module 370. The method 400 then proceeds to block 760.

Still referring to FIGS. 3 and 7, if the one or more processing devices 118 determine that no additional boot loaders 361 are located on the first memory 120-1, the method 400 proceeds to block 780, where the one or more processing devices 118 determines that the staged initialization protocol is complete and delegates control of the engine control system 116 to the operating system.

By executing the staged initialization protocol described above with reference to FIGS. 4-7, the priority software programs related to the control of the engine are authenticated, loaded, and executed prior to the authentication, loading, and execution of non-priority software programs. By executing the staged initialization protocol described herein, the software programs can quickly identify suspicious activity and/or evidence of tampering while simultaneously minimizing the negative impacts to the operation of the engine during the staged initialization protocol.

The functional blocks and/or flowchart elements described herein may be translated onto machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

Further aspects of the invention are provided by the subject matter of the following clauses:

A method for initiating an engine control system of an aircraft, the method comprising: authenticating, by one or more processors, a first stage boot loader; authenticating, by the one or more processors, a second stage boot loader in response to authentication of the first stage boot loader; and executing, by the one or more processors, the second stage boot loader in response to authentication of the second stage boot loader, wherein executing the second stage boot loader comprises: loading, by the one or more processors, an operating system, a first set of machine-readable instructions, and first configuration information associated with the first set of machine-readable instructions onto a non-transitory computer-readable medium, wherein the first set of machine-readable instructions and the first configuration information are associated with one or more priority partitions; authenticating, by the one or more processors, the operating system and the first set of machine-readable instructions; and executing, by the one or more processors, the first set of machine-readable instructions in response to authentication of the operating system and the first set of machine-readable instructions.

The method of any preceding clause, wherein authenticating the second stage boot loader in response to authentication of the first stage boot loader further comprises: determining, by the one or more processors, whether the engine control system is in a memory loader mode; and authenticating, by the one or more processors, a memory loader communicatively coupled to the one or more processors in response to determining that the engine control system is in the memory loader mode.

The method of any preceding clause, wherein authenticating the second stage boot loader in response to authentication of the first stage boot loader further comprises authenticating, by the one or more processors, the second stage boot loader in response to authentication of the memory loader.

The method of any preceding clause, further comprising: determining, by the one or more processors, that the first stage boot loader is not authenticated; loading, by the one or more processors, a backup image of the first stage boot loader; authenticating, by the one or more processors, the backup image of the first stage boot loader; and authenticating, by the one or more processors, the second stage boot loader in response to authentication of the backup image of the first stage boot loader.

The method of any preceding clause, further comprising: executing, by the one or more processors, the first set of machine-readable instructions within a predetermined period of time; loading, by the one or more processors, a second set of machine-readable instructions and second configuration information associated with the second set of machine-readable instructions onto the non-transitory computer-readable medium in response to the predetermined period of time elapsing, wherein the second set of machine-readable instructions and the second configuration information are associated with one or more non-priority partitions; authenticating, by the one or more processors, the second set of machine-readable instructions; and executing, by the one or more processors, the second set of machine-readable instructions in response to authentication of the second set of machine-readable instructions.

The method of any preceding clause, wherein: the one or more priority partitions are associated with application partitions that control an engine of the aircraft; and the one or more non-priority partitions are associated with the application partitions that do not control the engine of the aircraft.

The method of any preceding clause, further comprising cryptographically verifying, by the one or more processors, information associated with the one or more priority partitions, wherein the information is stored on a database communicatively coupled to the one or more processors.

The method of any preceding clause, wherein authentication of the first stage boot loader further comprises: generating or receiving, by the one or more processors, a public key; determining, by the one or more processors, that a private key of the first stage boot loader corresponds to the public key; and authenticating, by the one or more processors, the first stage boot loader.

The method of any preceding clause, wherein authentication of the first stage boot loader further comprises: generating or receiving, by the one or more processors, a public key; encrypting, by the one or more processors, the first stage boot loader with the public key; and authenticating, by the one or more processors, the first stage boot loader in response to the public key corresponding to an entry in a key database.

The method of any preceding clause, wherein authentication of the second stage boot loader further comprises: generating or receiving, by the one or more processors, a public key; determining, by the one or more processors, that a private key of the second stage boot loader corresponds to the public key; and authenticating, by the one or more processors, the second stage boot loader.

The method of any preceding clause, wherein authentication of the second stage boot loader further comprises: generating or receiving, by the one or more processors, a public key; encrypting, by the one or more processors, the second stage boot loader with the public key; and authenticating, by the one or more processors, the second stage boot loader in response to the public key corresponding to an entry in a key database.

The method of any preceding clause, further comprising authenticating, by the one or more processors, a third stage boot loader in response to authentication of the second stage boot loader.

A device for initiating an engine control system of an aircraft, the device comprising: one or more processors; and one or more non-transitory memory modules communicatively coupled to the one or more processors and storing machine-readable instructions that, when executed, cause the one or more processors to perform at least the following: authenticate a first stage boot loader; authenticate a second stage boot loader in response to authentication of the first stage boot loader; and execute the second stage boot loader in response to authentication of the second stage boot loader, wherein executing the second stage boot loader comprises: load an operating system, a first set of machine-readable instructions, and first configuration information associated with the first set of machine-readable instructions onto a non-transitory computer-readable medium, wherein the first set of machine-readable instructions and the first configuration information are associated with one or more priority partitions; authenticate the operating system and the first set of machine-readable instructions; and execute the first set of machine-readable instructions in response to authentication of the operating system and the first set of machine-readable instructions.

The device of any preceding clause, wherein authenticating the second stage boot loader in response to authentication of the first stage boot loader causes the one or more processors to perform at least the following: determine whether the engine control system is in a memory loader mode; and authenticate a memory loader communicatively coupled to the one or more processors in response to determining that the engine control system is in the memory loader mode.

The device of any preceding clause, wherein authenticating the second stage boot loader in response to authentication of the first stage boot loader causes the one or more processors to authenticate the second stage boot loader in response to authentication of the memory loader.

The device of any preceding clause, further comprising machine-readable instructions that, when executed, cause the one or more processors to perform at least the following: determine that the first stage boot loader is not authenticated; load a backup image of the first stage boot loader; authenticate the backup image of the first stage boot loader; and authenticate the second stage boot loader in response to authentication of the backup image of the first stage boot loader.

The device of any preceding clause, further comprising machine-readable instructions that, when executed, cause the one or more processors to perform at least the following: execute the first set of machine-readable instructions within a predetermined period of time; load a second set of machine-readable instructions and second configuration information associated with the second set of machine-readable instructions onto the non-transitory computer-readable medium in response to the predetermined period of time elapsing, wherein the second set of machine-readable instructions and the second configuration information are associated with one or more non-priority partitions; authenticate the second set of machine-readable instructions; and execute the second set of machine-readable instructions in response to authentication of the second set of machine-readable instructions.

The device of any preceding clause, wherein the one or more priority partitions are associated with application partitions that control an engine of the aircraft; and the one or more non-priority partitions are associated with the application partitions that do not control the engine of the aircraft.

The device of any preceding clause, further comprising machine-readable instructions that, when executed, cause the one or more processors to perform at least the following: cryptographically verify information associated with the one or more priority partitions, wherein the information is stored on a database communicatively coupled to the one or more processors.

A system comprising: an aircraft system; one or more processors; and one or more non-transitory memory modules communicatively coupled to the one or more processors and storing machine-readable instructions that, when executed, cause the one or more processors to perform at least the following: authenticate a first stage boot loader; authenticate a second stage boot loader in response to authentication of the first stage boot loader; and execute the second stage boot loader in response to authentication of the second stage boot loader, wherein executing the second stage boot loader comprises: load an operating system, a first set of machine-readable instructions, and first configuration information associated with the first set of machine-readable instructions onto a non-transitory computer-readable medium, wherein the first set of machine-readable instructions and the first configuration information are associated with one or more priority partitions; authenticate the operating system and the first set of machine-readable instructions; and execute the first set of machine-readable instructions in response to authentication of the operating system and the first set of machine-readable instructions.

The invention claimed is:

1. A method for initiating an engine control system of an aircraft, the method comprising:
   authenticating, by one or more processors, a first stage boot loaders;
   executing, by the one or more processors, the first stage boot loader in response to authentication of the first stage boot loader, wherein executing the first stage boot loader comprises:
      determining, by the one or more processors, whether the engine control system is in a memory loader mode based on whether the engine control system is connected to a memory loader;
      upon determination that the engine control system is not in the memory loader mode:
         authenticating, by the one or more processors, a second stage boot loader; and
         executing, by the one or more processors, the second stage boot loader in response to authentication of the second stage boot loader, wherein executing the second stage boot loader comprises:
            loading, by the one or more processors, an operating system, a first set of machine-readable instructions, and first configuration information associated with the first set of machine-readable instructions onto a non-transitory computer-readable medium, wherein the first set of machine-readable instructions and the first configuration information are associated with one or more priority partitions;
            authenticating, by the one or more processors, the operating system and the first set of machine-readable instructions; and
            executing, by the one or more processors, the first set of machine-readable instructions in response to authentication of the operating system and the first set of machine-readable instructions.

2. The method of claim 1, further comprising:
   upon determination that the engine control system is in the memory loader mode:
      authenticating, by the one or more processors, the memory loader connected to the engine control system;
      determining whether the memory loader is authenticated; and
      upon determination that the memory loader is not authenticated:
         recording, by the one or more processors, a security log of failed authentications of the memory loader;
         generating a corresponding output; and
         rebooting the first stage boot loader.

3. The method of claim 1, further comprising:
   determining, by the one or more processors, that the first stage boot loader is not authenticated;
   loading, by the one or more processors, a backup image of the first stage boot loader;
   authenticating, by the one or more processors, the backup image of the first stage boot loader; and
   authenticating, by the one or more processors, the second stage boot loader in response to authentication of the backup image of the first stage boot loader.

4. The method of claim 1, further comprising:
   executing, by the one or more processors, the first set of machine-readable instructions within a predetermined period of time;
   loading, by the one or more processors, a second set of machine-readable instructions and second configuration information associated with the second set of machine-readable instructions onto the non-transitory computer-readable medium in response to the predetermined period of time elapsing, wherein the second set of machine-readable instructions and the second configuration information are associated with one or more non-priority partitions;
   authenticating, by the one or more processors, the second set of machine-readable instructions; and
   executing, by the one or more processors, the second set of machine-readable instructions in response to authentication of the second set of machine-readable instructions.

5. The method of claim 4, wherein:
   the one or more priority partitions are associated with application partitions that control an engine of the aircraft; and
   the one or more non-priority partitions are associated with the application partitions that do not control the engine of the aircraft.

6. The method of claim 1, further comprising cryptographically verifying, by the one or more processors, information associated with the one or more priority partitions, wherein the information is stored on a database communicatively coupled to the one or more processors.

7. The method of claim 1, wherein authentication of the first stage boot loader further comprises:
   generating or receiving, by the one or more processors, a public key;
   determining, by the one or more processors, that a private key of the first stage boot loader corresponds to the public key; and
   authenticating, by the one or more processors, the first stage boot loader.

8. The method of claim 1, wherein authentication of the first stage boot loader further comprises:
   generating or receiving, by the one or more processors, a public key;
   encrypting, by the one or more processors, the first stage boot loader with the public key; and
   authenticating, by the one or more processors, the first stage boot loader in response to the public key corresponding to an entry in a key database.

9. The method of claim 1, further comprising authenticating, by the one or more processors, a third stage boot loader in response to authentication of the second stage boot loader.

10. The method of claim 1, further comprising:
determining, by the one or more processors, that the second stage boot loader is not authenticated; and
generating or receiving, by the one or more processors, an output indicating that the second stage boot loader is not authenticated.

11. The method of claim 1, further comprising:
if authentication of the second stage boot loader failed:
recording a security log indicating failed authentication; and
generating output, by the one or more processors, indicating potential suspicious activity.

12. The method of claim 1, further comprising:
upon determination that the engine control system is in the memory loader mode:
authenticating, by the one or more processors, the memory loader connected to the engine control system;
determining whether the memory loader is authenticated; and
upon determination that the memory loader is authenticated, executing the memory loader.

13. A device for initiating an engine control system of an aircraft, the device comprising:
one or more processors; and
one or more non-transitory memory modules communicatively coupled to the one or more processors and storing machine-readable instructions that, when executed, cause the one or more processors to perform at least the following:
authenticate a first stage boot loader;
execute the first stage boot loader in response to authentication of the first stage boot loader by:
determining whether the engine control system is in a memory loader mode based on whether the engine control system is connected to a memory loader;
upon determination that the engine control system is not in the memory loader mode:
authenticating a second stage boot loader; and
executing the second stage boot loader in response to authentication of the second stage boot loader, wherein executing the second stage boot loader comprises:
loading an operating system, a first set of machine-readable instructions, and first configuration information associated with the first set of machine-readable instructions onto a non-transitory computer-readable medium, wherein the first set of machine-readable instructions and the first configuration information are associated with one or more priority partitions;
authenticating the operating system and the first set of machine-readable instructions; and
executing the first set of machine-readable instructions in response to authentication of the operating system and the first set of machine-readable instructions.

14. The device of claim 13, wherein the one or more processors are further configured to:
upon determination that the engine control system is in the memory loader mode:
authenticate, by the one or more processors, the memory loader connected to the engine control system;
determine whether the memory loader is authenticated; and
upon determination that the memory loader is not authenticated:
record, by the one or more processors, a security log of failed authentications of the memory loader;
generate a corresponding output; and
reboot the first stage boot loader.

15. The device of claim 13, further comprising machine-readable instructions that, when executed, cause the one or more processors to perform at least the following:
determine that the first stage boot loader is not authenticated;
load a backup image of the first stage boot loader;
authenticate the backup image of the first stage boot loader; and
authenticate the second stage boot loader in response to authentication of the backup image of the first stage boot loader.

16. The device of claim 13, further comprising machine-readable instructions that, when executed, cause the one or more processors to perform at least the following:
execute the first set of machine-readable instructions within a predetermined period of time;
load a second set of machine-readable instructions and second configuration information associated with the second set of machine-readable instructions onto the non-transitory computer-readable medium in response to the predetermined period of time elapsing, wherein the second set of machine-readable instructions and the second configuration information are associated with one or more non-priority partitions;
authenticate the second set of machine-readable instructions; and
execute the second set of machine-readable instructions in response to authentication of the second set of machine-readable instructions.

17. The device of claim 16, wherein:
the one or more priority partitions are associated with application partitions that control an engine of the aircraft; and
the one or more non-priority partitions are associated with the application partitions that do not control the engine of the aircraft.

18. A system comprising:
an aircraft system;
one or more processors; and
one or more non-transitory memory modules communicatively coupled to the one or more processors and storing machine-readable instructions that, when executed, cause the one or more processors to perform at least the following:
authenticate a first stage boot loader;
execute the first stage boot loader in response to authentication of the first stage boot loader by:
determining whether the system is in a memory loader mode based on whether an engine control system of the aircraft is connected to a memory loader;
authenticating a second stage boot loader; and
executing the second stage boot loader in response to authentication of the second stage boot loader, wherein executing the second stage boot loader comprises:

loading an operating system, a first set of machine-readable instructions, and first configuration information associated with the first set of machine-readable instructions onto a non-transitory computer-readable medium, wherein the first set of machine-readable instructions and the first configuration information are associated with one or more priority partitions;

authenticating the operating system and the first set of machine-readable instructions; and executing the first set of machine-readable instructions in response to authentication of the operating system and the first set of machine-readable instructions.

19. The system of claim 18, wherein the one or more processors are further configured to:

upon determination that the system is in the memory loader mode:

authenticate, by the one or more processors, the memory loader connected to the engine control system of the aircraft;

determine whether the memory loader is authenticated; and upon determination that the memory loader is not authenticated:

record, by the one or more processors, a security log of failed authentications of the memory loader;

generate a corresponding output; and reboot the first stage boot loader.

20. The device of claim 13, wherein the one or more processors are further configured to:

upon determination that the engine control system is in the memory loader mode:

authenticate, by the one or more processors, the memory loader connected to the engine control system;

determine whether the memory loader is authenticated; and upon determination that the memory loader is authenticated, execute the memory loader.

* * * * *